US008813259B2

(12) United States Patent
Dodgson et al.

(10) Patent No.: US 8,813,259 B2
(45) Date of Patent: Aug. 19, 2014

(54) DYNAMIC LICENSING (75) Inventors: David S. Dodgson, Lansdale, PA (US);
Anthony Narisi, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/547,160

(22) Filed: Jul. 12, 2012

(65) Prior Publication Data

US 2014/0020107 A1 Jan. 16, 2014

(51) Int. Cl.
*G06F 21/10* (2013.01)

(52) U.S. Cl.
CPC .............. *G06F 21/10* (2013.01); *G06F 21/105* (2013.01)
USPC .................... 726/31; 726/26; 726/27; 726/29

(58) Field of Classification Search
CPC ..... G06F 21/10; G06F 21/105; G06F 21/606; G06F 2009/45587; H04L 63/065; H04L 63/104; H04L 63/0428
USPC ......................................... 726/26–27, 29, 31
See application file for complete search history.

(56) References Cited

U.S. PATENT DOCUMENTS

| 6,574,612 | B1 * | 6/2003 | Baratti et al. .................. 705/59 |
| 2002/0107809 | A1 * | 8/2002 | Biddle et al. .................... 705/59 |
| 2007/0179899 | A1 * | 8/2007 | Hase et al. ...................... 705/59 |
| 2012/0311564 | A1 * | 12/2012 | Khalid .............................. 718/1 |
| 2013/0074189 | A1 * | 3/2013 | Boudreau et al. ................ 726/26 |
| 2013/0144633 | A1 * | 6/2013 | Guadarrama et al. ......... 705/1.1 |

* cited by examiner

*Primary Examiner* — Joseph P. Hirl
*Assistant Examiner* — Kalish Bell
(74) *Attorney, Agent, or Firm* — Richard J. Gregson (57) ABSTRACT

Dynamic licensing improves the utilization of licenses available within a computer network. License sinks, such as gateways, within a computer network may request licenses from a license source. The license source may be provisioned with a number of licenses from a secure fob plugged into the license source. If the license source has the number of licenses requested from the license sink, the license source may assign the licenses to the license sink. After a certain period of time, the license sink may renew the licenses or let the licenses return to the license source to be assigned to another license sink. The license requests may be passed through the network, including through a proxy and/or a relay, to a license server provisioned with licenses. Dynamic licensing software may execute as a service on each of the license sources and license sinks to pass dynamic licensing messages between devices.

20 Claims, 10 Drawing Sheets

```
<?xml version="1.0"?>
<DynLicense version="1.0">
<MessageID>0024E879CDD7-00020</MessageID>
<GUID>E3E85336-F562-4535-B036-578AA8C7DABC</GUID>
<Request version="1.0">
<Licenses>15</Licenses>
</Request>
</DynLicense>
```

FIG. 3A

```
<?xml version="1.0"?>
<DynLicense version="1.0">
<MessageID>0024E879CDD7-00020</MessageID>
<GUID>E3E85336-F562-4535-B036-578AA8C7DABC</GUID>
<Reply version="1.0">
<Allocated>15</Allocated>
</Reply>
</DynLicense>
```

DYNAMIC LICENSING

FIELD OF THE DISCLOSURE

The instant disclosure relates to computer software. More specifically, this disclosure relates to licensing computer software.

BACKGROUND

Computer software may be licensed according to several different schemes. In one conventional licensing model, computer software is licensed on a flat per-site rate. That is, a purchaser of the computer software is charged a flat fee to cover all uses of the software. Regardless of how many users are executing the software, the per-site rate does not change. This scheme for licensing software requires the least overhead: once the per-site rate is paid, no further administration is required by the purchaser to ensure the use of the software does not exceed the license limits.

In another conventional licensing model, computer software is licensed on a per-user rate. That is, for each user of the computer software, a separate license is required to execute the software. Per-user licensing may allow a purchaser to obtain licensing to the software at a much lower cost than per-site licensing. For example, a purchaser's site may have five thousand employees, of which only one hundred employees need access to the computer software. Thus, purchasing a per-site license for five thousand employees will be significantly more expensive than purchasing one hundred per-user licenses. However, per-user licensing involves more overhead than per-site licensing.

Under a per-user licensing scheme, an administrator manually configures computers with an appropriate license to execute the computer software. The license may take the form of a special key entered into the computer within the computer software, a special file loaded onto the computer read by the computer software, and/or a hardware key plugged into a port on the computer read by the computer software. In addition to installing the licenses on computer systems, an administrator must be adamant about recovering the license when the user of the computer system no longer uses the computer software. For example, as employees change projects, employees are terminated, or new employees are hired, licenses may be transferred between computers to allow different users to operate the computer software.

As a result of the increased overhead, purchasers of computer software often spend a significant portion of the money saved from buying a per-site license on administrative time to manage the per-user licenses. Further, even with the best administration, some licenses may be underutilized. For example, a license may be requested by a user not actually using the computer software. Thus, the license is purchased but rarely or never used by the user assigned the license. Further, licenses may be lost or forgotten, such as when installed on a computer that administrators lose track of.

Per-user licenses have additional problems when used to license computer software installed in virtual machines. Because a virtual machine may be cloned and altered, managing per-user licenses may be difficult. Additionally, users accessing the computer software may rapidly connect and disconnect and connect from different locations on a network.

Conventional licensing schemes for computer software described above involve static licensing. That is, whether a per-user or per-site license is purchased, the license is assigned to a particular location or a particular user, and the license remains there until manually reassigned to another site or another user. That static nature of the licensing schemes results in administrative overhead that reduces the utilization of the licenses and increase costs due to increased administrator time to continue use of each of the licenses.

SUMMARY

Dynamic licensing assigns licenses to devices as requested by the devices, which improves efficiency in handling of the licenses. For example, license sinks may be monitored and the number of licenses assigned to the licenses sink may be adjusted. According to one embodiment, this may include estimating how many licenses may be needed during a future time period and/or using a license event to signal when the number of licenses is running low. Time limits may be placed on licenses assigned to a license sink, such that the licenses may be discarded if not renewed within a specified time interval. Licenses allocated to one license sink by a license source may be reused if not renewed.

According to one embodiment, a method includes receiving license requests from a plurality of virtual machines. The method also includes determining a quantity of licenses for the plurality of virtual machines. The method further includes requesting the quantity of licenses from a first license source.

According to another embodiment, a computer program product includes a non-transitory computer readable medium having code to receive licensing requests from a plurality of virtual machines. The medium also includes code to determine a quantity of licenses for the plurality of virtual machines. The medium further includes code to request the quantity of licenses from a first license source.

According to yet another embodiment, an apparatus includes a memory, a network interface, and a processor coupled to the memory and the network interface. The processor is configured to receive licensing requests for a plurality of virtual machines through the network interface. The processor is also configured to determine a quantity of licenses for the plurality of virtual machines. The processor is further configured to request the quantity of licenses from a first license source.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Dynamic licensing allows for licenses to computer software to be managed electronically by assigning licenses from a license source for temporary use by a license sink on a network. For example, rather than statically assigning a license to a device on a network during configuration of the device, the device may request licenses from a license source when computer software on the device is accessed.

In one embodiment, the device may be a gateway, which acts as a sink of licenses acquired from a license source. The gateway may monitor itself and adjust the number of licenses requested from the source based upon activity occurring in the gateway. Additional licenses may be requested by sending a request message to a license source. The license source may respond with a message either granting the requested licenses or refusing the requested licenses. If refused, the gateway may request licenses from another license source, or reduce the number of licenses requested and try again.

According to one embodiment, a gateway may be a virtual gateway executing on a virtual machine. The virtual gateway may communicate with other virtual machines executing on the same physical hardware and/or with other virtual machines sharing a communications network. The virtual gateway may communicate with other virtual machines through a community-of-interest, which shares an encryption key such that only other members of the community-of-interest may decrypt messages transmitted within the community-of-interest. When the virtual gateway is assigned to a community-of-interest, the gateway may handle all license requests for virtual machines within the community-of-interest. As virtual machines start and stop within the community-of-interest, the virtual gateway may calculate a number of dynamic licenses for the virtual machines to process data within the community-of-interest and request the licenses from a license source.

Dynamic licensing allows separation of the license configuration for computer software from the device executing the computer software. Such a configuration provides additional flexibility in the deployment of devices, such as gateways and computers, on a computer network. Further, dynamic licensing is beneficial in an environment where license requirements may frequently change, such as in a network with a number of virtual machines.

Figure 1:
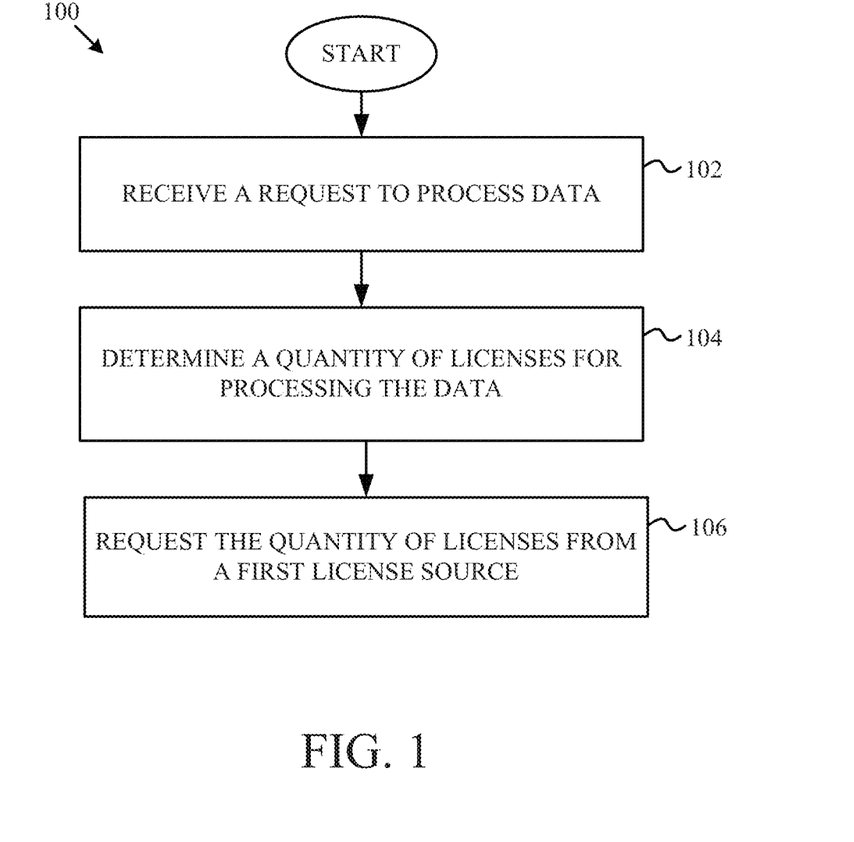
FIG. 1 is a flow chart illustrating a process of dynamic licensing of a device according to one embodiment of the disclosure.

FIG. 1 is a flow chart illustrating a process of dynamic licensing of a license sink according to one embodiment of the disclosure. A method 100 begins at block 102 with receiving a request to process data at a license sink, such as a gateway, a computer, or a virtual machine in communication with the gateway. In one embodiment, the data to be processed may be network data for handling network communications. In another embodiment, the data may be application data, such as data to be processed in a database or algorithm. At block 104, the method 100 determines a quantity of licenses for processing the data. At block 106, the quantity of licenses is requested from a first license source.

In the case that the license sink requesting a license in FIG. 1 is a virtual machine sharing a community-of-interest with a virtual gateway, the request for licenses at block 106 may be transmitted to the virtual gateway. The virtual gateway may accumulate requests from virtual machines in the community-of-interest over a predetermined period of time, such as five seconds, and submit a request to a license server for a number of licenses based, in part, on the number of received requests for licenses.

Figure 2:
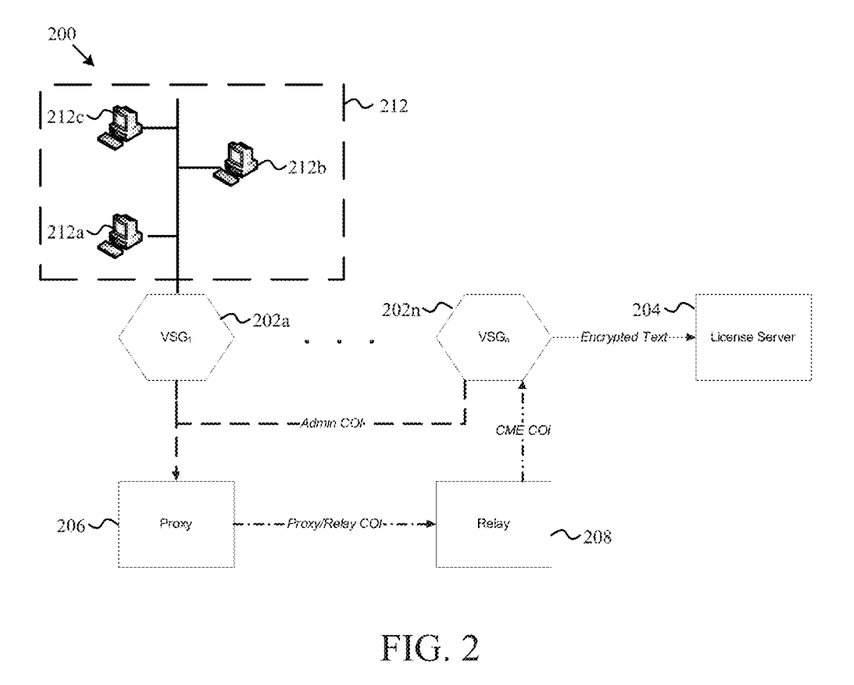
FIG. 2 is a block diagram illustrating a network of license sources and license sinks according to one embodiment of the disclosure.

FIG. 2 is a block diagram illustrating a network of license sources and license sinks according to one embodiment of the disclosure. A network 200 may include gateways 202a-202n. The gateways, such as the gateway 202n, may communicate with a license server 204. When the gateway 202n receives data to process at block 102 of the method 100 of FIG. 1, the gateway 202n may determine a quantity of licenses for processing the data at block 104 of FIG. 1 and request the quantity of licenses from the license server 204 at block 106 of FIG. 1. The message containing the request for the quantity of licenses may be formatted as a text document, such as an extensible markup language (XML) document. According to one embodiment, the message requesting the quantity of licenses may be encrypted.

Additional gateways 202a-202n may also perform the method 100 of FIG. 1. That is, the additional gateways 202a-202n may request licenses from the license server 204. Each of the gateways 202a-n may be virtual gateways assigned to different communities-of-interest. For example, the gateway 202a may be assigned to communicate with a community-of-interest 212 having virtual machines 212a-c. When the gateways 202a-202n do not have a direct communications link to the license server 204, the gateways 202a-202n may pass a license request message through other gateways of the gateways 202a-202n to the license server 204. The requests may be transmitted through an infrastructure community-of-interest, such as an administrative community-of-interest to which the gateways 202a-n are members.

Further, license sources for the gateways 202a-202n may include one or more license proxies, such as proxy 206, and one or more license relays, such as relay 208. A license sink, such as the gateway 202a, may request licenses from the relay 208, which then requests licenses from the license server 204. There may be more than one relay daisy-chained together, which pass requests from one relay to the next relay until a license server is reached. In addition to relaying requests, a relay may combine two or more licenses requests received from the gateways 202a-n. For example, if the gateway 202a requests 20 licenses from the relay 208 and the gateway 202b requests 20 licenses from the relay 208, then the relay 208 may request 40 licenses from the license server 204. Thus, the relay 208 may reduce traffic on the network 200 by combining requests.

The proxy 206 may also serve as a license source for the gateways 202a-202n. However, the proxy 206 may serve only as a pass-through device for passing license request messages to the relay 208 and/or the license server 204. The proxy 206 may be configured in a community-of-interest shared with the gateway 202a. Communities-of-interest may share an encryption key, such that devices or virtual machines within the community-of-interest may engage in private communications even over a network shared with other devices or over hardware shared with other virtual machines. Security may be improved when communications to the gateway 202a are restricted to devices and/or virtual machines that are members of the community-of-interest. By joining the proxy 206 to a community-of-interest with the gateway 202a, the proxy 206 may receive requests from the gateway 202a. An infrastructure community-of-interest, such as a proxy/relay community-of-interest, may be configured between the proxy 206 and the relay 208 to allow the request from the gateway 202a to be passed to the license server 204.

Although only one license server is illustrated in FIG. 2, the network 200 may include more than one license server. For example, if a network is organized into a number of logical sites, each site may have a license server. In another example, the network 200 may have two or more license servers, in which the license servers provide redundant capability in the event of a failure of any of the license servers.

Licenses assigned by the license server 204 may have a limited time of operation. According to one embodiment, a license sink, such as the gateways 202a-n and the relay 208 repeatedly request licenses. The licenses may be requested as specific intervals, on a periodic basis, and/or when specific events occur. The license server 204 may release licenses allocated to an assignee if the license server 204 does not receive another request within a certain time period. Thus, licenses may be collected for other devices. Similarly, the relay 208 or the gateways 202a-b may release received licenses if a renewal of those licenses is not received.

According to one embodiment, license requests may not be split among various sources. For example, if a license sink, such as the gateway 202n requests 50 licenses, and only 30 are available from the license server 204, the license server 204 may not allocate those 30 licenses to the gateway 202n. Instead, the gateway 202n may request 50 licenses from a different license server. However, the license server may also be configured to provide partial grants of requested licenses.

Figure 3A:
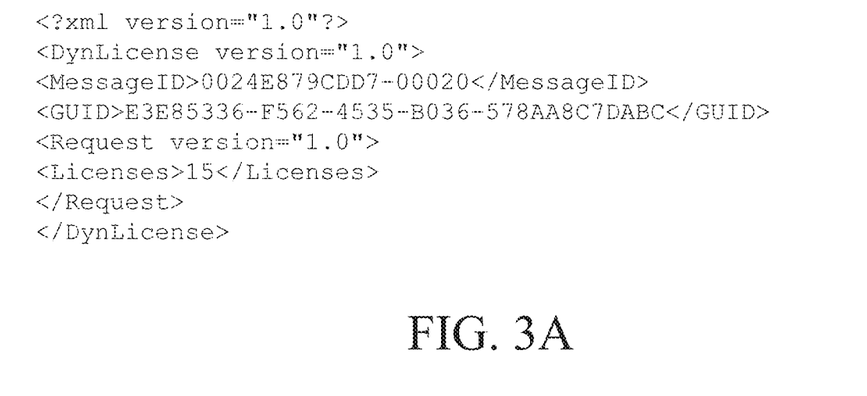
FIG. 3A is a code listing of an XML message containing information regarding a request for dynamic licenses according to one embodiment of the disclosure.
Figure 3B:
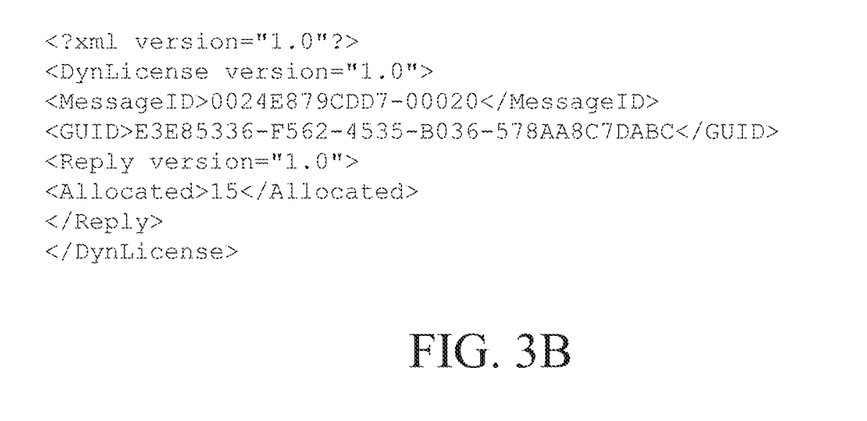
FIG. 3B is a code listing of an XML message containing information regarding an allocation of dynamic licenses according to one embodiment of the disclosure.

Messages for dynamic licensing described above in FIG. 1 and FIG. 2 may be XML messages, such as those illustrated in FIGS. 3A-B. The XML messages may include status information, requests for licenses, and/or assigned licenses. FIG. 3A is a code listing of an XML message containing information regarding a request for dynamic licenses according to one embodiment of the disclosure. FIG. 3B is a code listing of an XML message containing information regarding an allocation of dynamic licenses according to one embodiment of the disclosure.

Software may be installed on license sinks, such as the gateways 202a-n, the proxy 206, and the relay 208, and the license server 204 to handle messages, such as the message illustrated in FIG. 3. According to one embodiment, the software may execute as a service on license sinks and license sources. Messages may be passed between the services on various devices using socket input/output (I/O). One port may be chosen for communications, such as port 31420. Message content may be encrypted using, for example, a Secure Socket Protocol (SSP) to provide additional security. According to one embodiment, message encryption may be disabled if the two devices communicating are secure devices.

Messages may be handled asynchronously by the software. Messages may be placed in a queue upon arrival at a device and removed and processed one at a time. The queue may be handled in the order received, such as in a First-In-First-Out (FIFO) queue, or the queue may prioritize messages based, in part, on the source of the message. In addition to a request for licenses or a grant of licenses, each message may include an identifier (ID). When a request is sent, the ID may be recorded in a table. When a response is received, the ID may be matched against the table entries. If a response is not received in a timely fashion, the ID may be removed from the table during a time-out procedure. Responses received after the timeout may be rejected.

Licenses may be acquired by the license server 204 through software configuration and/or a hardware device. For example, the license server 204 may be connected to a license store through a fob interface to a fob. According to one embodiment, the fob may be a small universal serial bus (USB) device having an interface similar to a smart-card. A purchaser of software licenses may receive a fob provisioned with the purchased number of licenses. The fob may be attached to the license server 204 through a port, such as the USB port. Software executing on the license server 204, such as the dynamic licensing service, may use an interface to the fob to determine the number of licenses available. Removing the fob from the license server 204 may cause the licenses to be released and prevent the license server 204 from renewing the licenses assigned to devices on the network 200 that originated from the fob. The fob may also be attached to one of the virtual gateways 202a-202n, such that the virtual gateway may act as a license source.

According to one embodiment, license requests may be transmitted between two devices through a secure tunnel, such as through the stealth tunneling protocol (STP). License requests may originate at the gateway 202a and be transmitted to another gateway, such as the gateway 202n. An administrative community-of-interest (COI) tunnel may be created between the gateway 202a, the gateway 202n, and other gateways between the gateway 202a and the gateway 202n. If the license server 204 is on an unencrypted, or clear text, side of the gateway 202n, then a relay may be placed on the encrypted side of the gateway 202n to handle secure communications to the license server 204. According to one embodiment, a proxy may be used to couple a relay on a secure side of the gateway 202n, which can then use a community-of-interest (COI) to open a tunnel through the gateway 202n to the license server 204.

Dynamic licensing software on a device may be controlled through a user interface, such as a command line interface (CLI) and/or a graphical user interface (GUI). Configurations of the dynamic licensing software may be controlled locally through hardware coupled to a device, or remotely from another device. When remote control is used, messages may carry configuration data between devices.

Commands for controlling dynamic licensing software may include commands for installing, initializing, stopping, or removing the service for handling dynamic licensing messages. For example, commands may include unregistering a license server, unregistering a secure sockets layer (SSL) encryption service, and/or registering a service.

Commands may also be issued to dynamic licensing software to discover a status of dynamic licensing components, such as the licensing server 204 and the gateways 202a-n of FIG. 2. A status command may request a report of a general status of a system. An allocation command may report allocations made within the network 200 of FIG. 2. An example of a status report is provided in FIG. 4.

Figure 4:
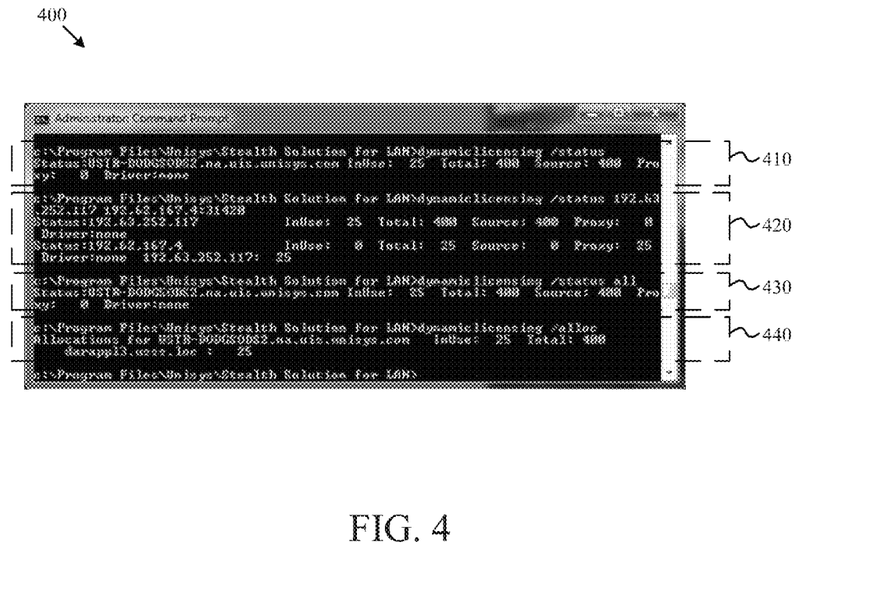
FIG. 4 is a screen shot of a command line interface providing a status report according to one embodiment of the disclosure.

FIG. 4 is a screen shot of a command line interface providing a status report according to one embodiment of the disclosure. A first portion 410 of a status report 400 may include a status of a particular system in the network 200. The status may include the system id, number of licenses allocated, total number of licenses available, number of licenses for which it is a source, number of licenses for which it is a proxy, and/or number of licenses assigned. The first portion 410 may also include details regarding an encryption package if one is installed.

A second portion 420 of the status report 400 may provide a url-list. The second system listed in the second portion 420 is a proxy and, thus, may also show the source of its licenses. A third portion 430 of the status report 400 may request the status report of all systems it is configured to contact, or the local system if none. A fourth portion 440 of the status report 440 may list the number of licenses allocated and which systems are using them.

Figure 5:
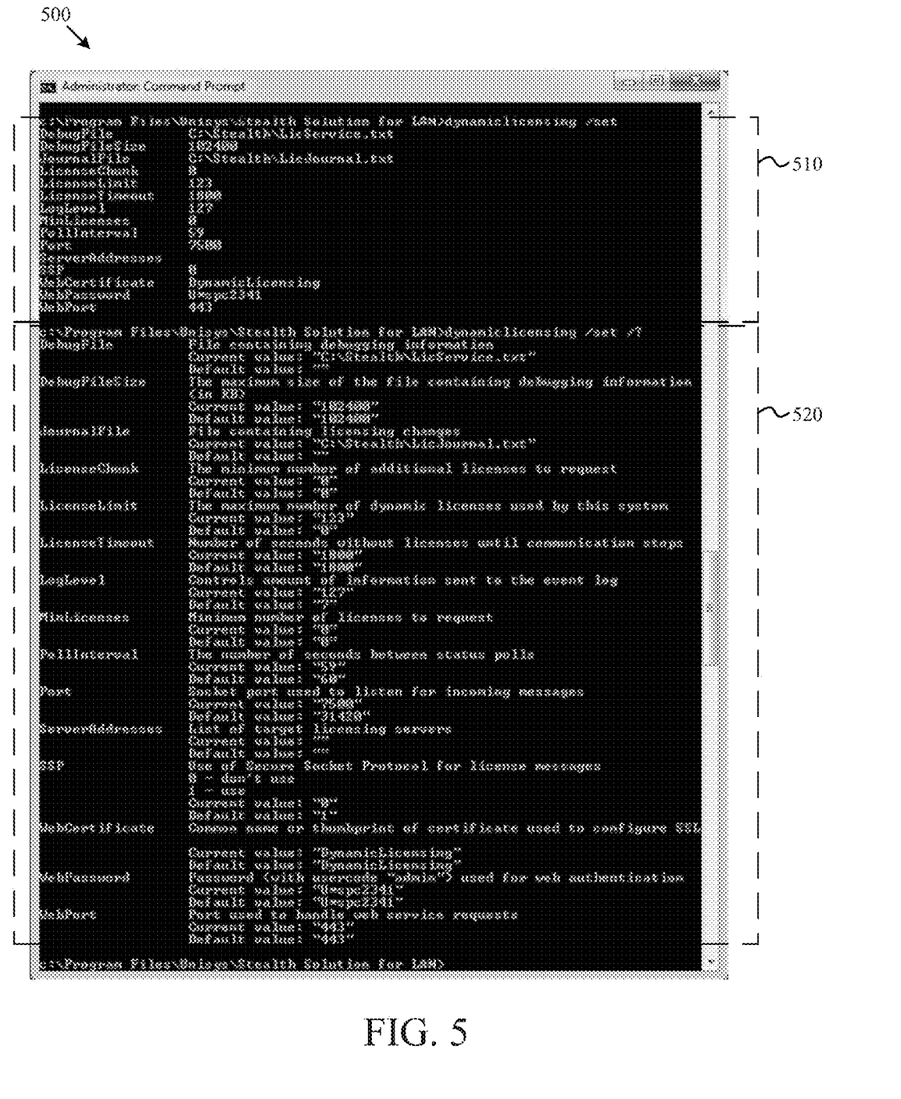
FIG. 5 is a screen shot of a command line interface providing a listing of configuration parameters for dynamic licensing according to one embodiment of the disclosure.

Commands may be issued to dynamic licensing software to set configurations for the devices executing dynamic licensing software. FIG. 5 is a screen shot of a command line interface providing a listing of configuration parameters for dynamic licensing according to one embodiment of the disclosure. Options available may include server addresses, license limits, minimum number of licenses, license chunk size, debug file, debug file size, port, web port, web password, web certificate, poll interval, log level, journal file, and encryption settings.

A first portion 510 of configuration settings 500 may provide an indication of values for various settings. A second portion 520 may provide a summary of the settings. The portions 510 and 520 may be triggered by different commands.

Server addresses settings may include a list of dynamic licensing systems, such as proxies, relays, and/or license servers. License limit settings may include a maximum number of dynamic licenses or a null value to indicate that dynamic licensing is not in use. On a gateway, the license limit value may be set to a value that approximates the maximum number of licenses it can handle based on its system configuration. The license limit may be set to a smaller value to limit the licenses used by the gateway. For example, a smaller license limit may prevent one gateway from usurping all available licenses. On a license server, the license limit value may be used to limit the number of licenses to less than those provided through a fob. A minimum number of license may set a number of licenses to always request. The minimum licenses parameter may be used to pre-allocate licenses for a high priority application and/or device. A license chunk setting may specify a round up number for the number of licenses to requests. The size of a license chunk may increase as the number of licenses in use gets larger. Setting the chunk size to a small value may limit the number of extra licenses requested and may be used where there is little variance in the number requested.

Debug file and debug file size settings may configure the location and amount of debugging information to be stored. A port setting may specify a port for the dynamic licensing software to listen to for incoming license requests. A web port setting may specify a port for listening to requests from the Internet. A web password setting may specify a password required to authorize web requests. A web certificate setting may specify a certificate name (CN) or thumbprint used for SSL encryption. A poll interval setting may determines a frequency of license requests. A log level setting may specify an amount of information to be logged to the debug file. The log level may be one of a number of pre-determined arbitrary values.

Figure 6:
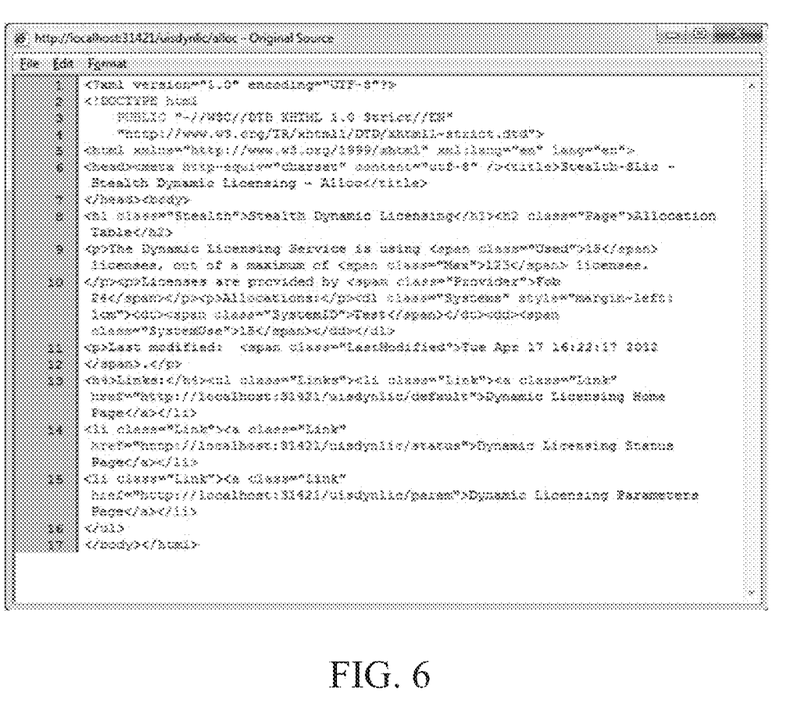
FIG. 6 is a code listing of an XHTML message containing information regarding an allocation of dynamic licenses according to one embodiment of the disclosure.

A web service may execute on a device executing dynamic licensing software to provide a web interface for retrieving information regarding a current state of the dynamic licensing services in a network and/or configure devices in the network. The web service may support hypertext transfer protocol (HTTP) GET requests on universal resource indicators (URIs). The content of a GET request may be formatted similar to requests made through the command line interface. Information and/or status reports generated by the web service may be returned to a user in extensible hypertext markup language (XHTML) format with a content-type of "text/html" which may be human-readable and XML-parseable. FIG. 6 is a code listing of an XHTML message containing information regarding an allocation of dynamic licenses according to one embodiment of the disclosure.

According to one embodiment, the XHTML representation of data regarding the dynamic licensing software may conform to a document type definition (DTD). The values in the file may be identified by a "class" attribute of enclosing tags within the XHTML file. In one example, the "Systems" class may identify the tag enclosing the entries in the allocation table. Each entry may contain a "SystemID" class with the name of the system receiving the allocation, and a "SystemUse" class with the number of licenses allocated. Other entries may identify the total number of licenses in use ("Used"), the maximum available for use ("Max"), the source of the licenses ("Provider"), and/or the time and date of the last modification to the table ("LastModified").

Requests made to a web service through a GET request may include a brief overview of dynamic licensing, a home page, a description of how licenses are allocated, a status of service properties, and/or a value of configuration parameters. Certain requests made through HTTP or HTTPS may be configured to require authentication. For example, requests to allocate licenses and/or reconfigure parameters may be required to be encrypted. When encrypted, the HTTP GET request or the HTTPS GET request may include an authorization header, such as a valid usercode and password. The usercode and/or password may be changed by setting a web password configuration parameter described above. According to one embodiment, encryption may be performed through a secure sockets layer (SSL) protocol. When the SSL protocol is used, a certificate may be accessed by the dynamic licensing software for performing unique encryption.

Figure 7:
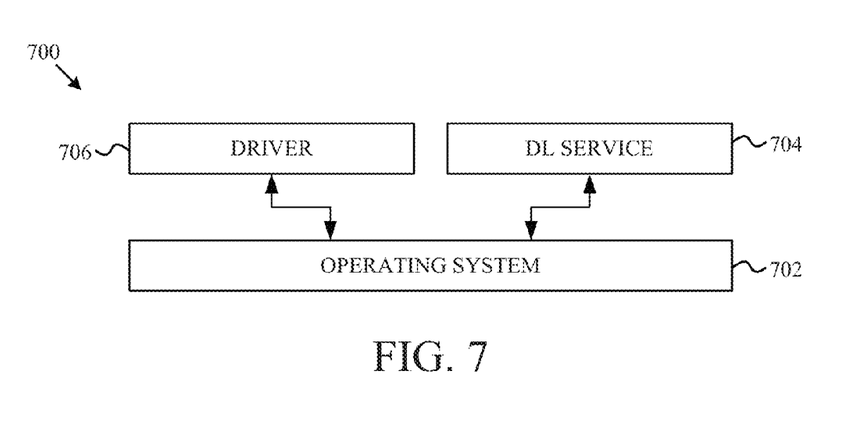
FIG. 7 is a block diagram illustrating interaction between dynamic licensing software and a license sink according to one embodiment of the disclosure.

FIG. 7 is a block diagram illustrating interaction between dynamic licensing software and a license sink according to one embodiment of the disclosure. A device 700 may include an operating system 702 for executing applications. The operating system 702 may be, for example, Windows, Linux, a proprietary software, or the like. The operating system 702 may also be executing in an emulated environment on a hyper-visor based computer system. A driver 706 may execute in the operating system 702 to process network data. For example, the driver 706 may perform the duties of a gateway on a network. The dynamic licensing service 704 may also execute in the operating system 702 to perform licensing for the driver 706.

Dynamic Licensing (DL) provides a method for gateways to ask for a certain number of licenses. The number requested may vary based upon need, and the driver 706 may request additional licenses from the DL service 704 to process data, such as network data. The DL service 704 may communicate with the driver 706 using an input/output control (IOCTL). The DL service 704 may use the IOCTL to communicate to the driver 706 the number of licenses obtained or refused. The driver 706 may use the number of licenses provided by the DL service 704. Upon receiving the licenses from the DL service 704, the driver 706 may start a timer. The licenses may be released if the timer exceeds a predetermined value, without a renewal of the licenses. The DL service 704 may communicate with the driver 706 periodically, intermittently, or upon the occurrence of certain events.

A DynLicenses registry entry in the operating system 702 may control use of the DL service 704 to assign licenses to the driver 706. If DynLicenses is set to 0, then the DL service 704 may be deactivated and the driver 706 may operate without licenses. If DynLicneses is set to N, then the DL service 704 may assume N is a maximum number of dynamic licenses that can be handled by the driver 706.

According to one embodiment, the DL service 704 may be a standard Windows service, and may execute on each device that uses Dynamic Licensing, including license sources, license sinks, and/or license relays. The DL service 704 may process DL messages traveling between systems, such as the gateways 202a-202n, the license server 204, the proxy 206, and the relay 208 of FIG. 2. Message handling may be asynchronous or synchronous, and messages may be handled as both a server and a client on each device. A server side of the DL service 704 may listen on an assigned port and handle requests received through the assigned port. A client side may transit requests to other devices.

Messages may be queued upon arrival at a device. A monitoring thread of the DL service 704 executing within the operating system 702 may retrieve messages from the queue and processes each message. If the message is an incoming message to the server side, the monitoring thread may respond immediately, if possible. Otherwise, the message may be assigned to a job, which may be a finite state machine handled by the monitor thread and activated in responses to requests transmitted by the monitor thread. When a web service is also executing on the operating system 702 for interfacing with the DL service 704, messages received through the web service may be placed in the same queue and handled by the monitoring thread.

As described above with reference to FIGS. 3A-B, the messages may be XML messages. The messages may be parsed upon arrival at the DL service 704 by the monitor thread. When a parse is unsuccessful, the message may be rejected. A license sink, such as the gateway 202n of FIG. 2, may send a license request to a device configured in the LicServerAddresses registry parameter of the operating system 702. The device receiving the message may respond immediately if it is a license source or the device may send the request to a relay. Requests may pass through multiple relays to reach a license source. The license source may respond with an allocation of licenses if available, or a rejection if not. The rejection message may include a number of licenses available at the license source. If this response returns to a relay, then the relay may store the licenses received and respond to requests for licenses pending with the relay. If a messages arrives at the license sink indicates a successful assignment of the requested number of licenses, the licenses may be passed from the DL service 704 to the driver 706. If a failure message is returned from the license source, the DL service 704 may send a request to the next configured device. If all requests are unsuccessful, the DL service 704 may reduce the requested number of licenses and repeat the request for obtaining dynamic licenses.

According to one embodiment, the DL service 704 may send requests for licenses periodically, based, in part, on a configured poll interval. The DL service 704 may calculate a number of licenses by querying the driver 706 for the number of licenses currently in use and round up the number of currently used licenses to a closest configured chunk of licenses. For example, if a configured license chunk size is 6 licenses and the driver 706 reports 10 currently used licenses, then the DL service 704 may request 12 licenses from a license source. If the DL service 704 cannot obtain the licenses, then the DL service 704 may deallocate previously received licenses after a predetermined number of failures, such as three failures. The DL service 704 may also send a request for licenses when an event occurs. For example, the driver 706 may notify the DL service 704 that the driver 706 has consumed a predetermined percentage, such as 80%, of the assigned licenses.

When the DL service 704 executes on a license source, such as the license server 204 of FIG. 2, the DL service 704 may include an interface to a license fob. When the fob is inserted and detected by the operating system 702, the DL service 704 may be notified by the operating system 702. The fob may be examined for a license count available on the fob. The DL service 704 on the license source may maintain an allocation table, which stores a number of licenses received from the fob and a list of licenses allocated to license sinks, along with an identifier of the license sink. According to one embodiment, the DL service 704 may write the allocations to a journal file.

Figure 8:
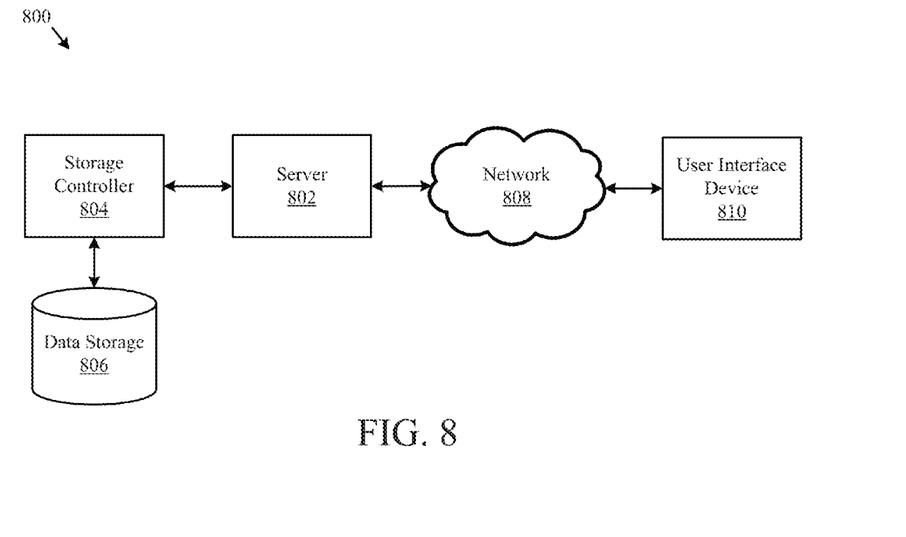
FIG. 8 is a block diagram illustrating a computer network according to one embodiment of the disclosure.

FIG. 8 illustrates one embodiment of a system 800 for an information system, including a system for deploying dynamic licensing. The system 800 may include a server 802, a data storage device 806, a network 808, and a user interface device 810. The server 802 may be a dedicated server or one server in a cloud computing system. The server 802 may also be a hypervisor-based system executing one or more guest partitions. In a further embodiment, the system 800 may include a storage controller 804, or storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other a mobile communication device having access to the network 808. The user interface device 810 may be used to access a web service executing on the server 802, such as a license sink or license source. The user interface device 810 may have the dynamic licensing service installed, which is used to access the web service executing on the server 802. When the device 810 is a mobile device, sensors (not shown), such as a camera or accelerometer, may be embedded in the device 810. When the device 810 is a desktop computer the sensors may be embedded in an attachment (not shown) to the device 810. In a further embodiment, the user interface device 810 may access the Internet or other wide area or local area network to access a web application or web service hosted by the server 802 and provide a user interface for enabling a user to enter or receive information.

The network 808 may facilitate communications of data, such as dynamic licenses messages, between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 810 accesses the server 802 through an intermediate sever (not shown). For example, in a cloud application the user interface device 810 may access an application server. The application server may fulfill requests from the user interface device 810 by accessing a database management system (DBMS). In this embodiment, the user interface device 810 may be a computer or phone executing a Java application making requests to a JBOSS server executing on a Linux server, which fulfills the requests by accessing a relational database management system (RDMS) on a mainframe server.

Figure 9:
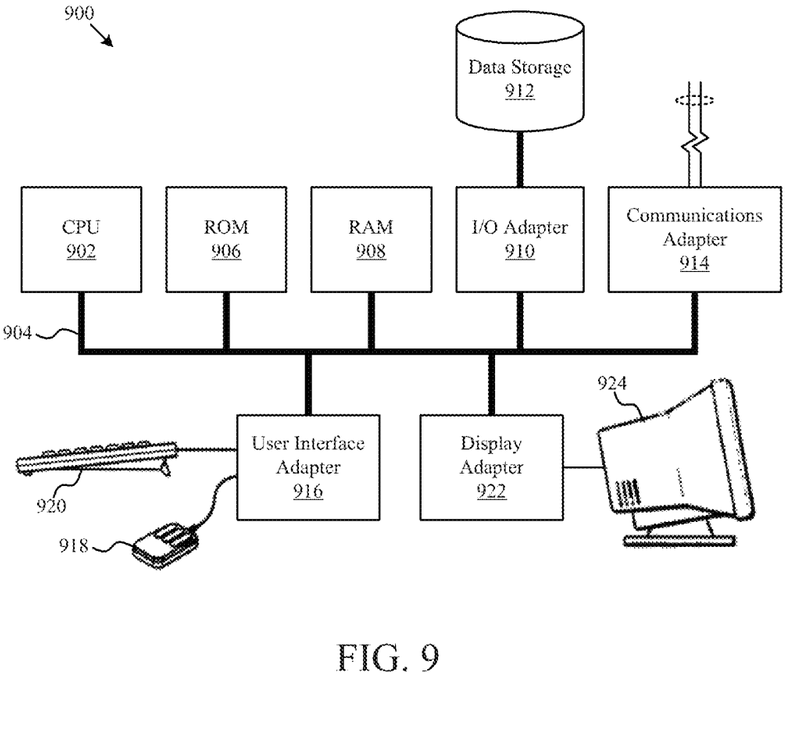
FIG. 9 is a block diagram illustrating a computer system according to one embodiment of the disclosure.

FIG. 9 illustrates a computer system 900 adapted according to certain embodiments of the server 802 and/or the user interface device 810. For example, the computer system 900 may be the gateway 202n, the proxy 206, the relay 208, or the server 204 of FIG. 2. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 also may include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an input/output (I/O) adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 800 through a network connection to the I/O adapter 910. The communications adapter 914 may be adapted to couple the computer system 900 to the network 808, which may be one or more of a LAN, WAN, and/or the Internet. The communications adapter 914 may also be adapted to couple the computer system 900 to other networks such as a global positioning system (GPS) or a Bluetooth network. The user interface adapter 916 couples user input devices, such as a keyboard 920, a pointing device 918, and/or a touch screen (not shown) to the computer system 900. The keyboard 920 may be an on-screen keyboard displayed on a touch panel. Additional devices (not shown) such as a camera, microphone, video camera, accelerometer, compass, and or gyroscope may be coupled to the user interface adapter 916. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of a server 802 and/or the user interface device 810. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 10A:
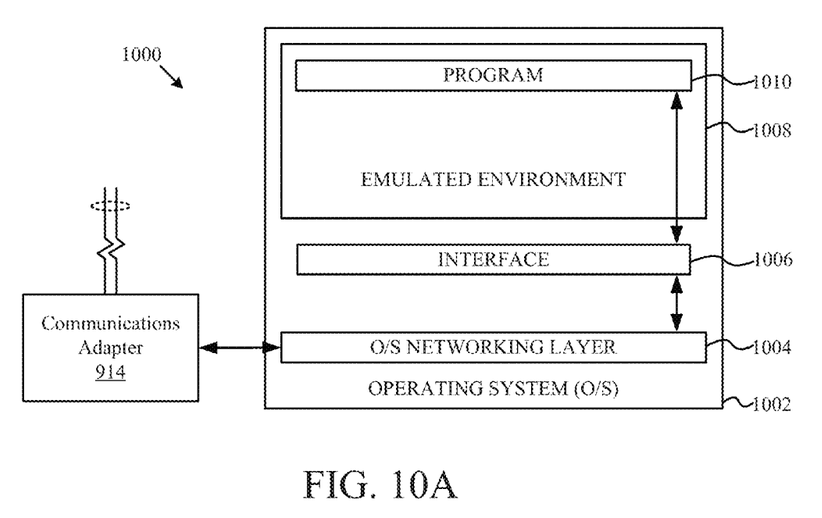
FIG. 10A is a block diagram illustrating a server hosting an emulated software environment for virtualization according to one embodiment of the disclosure.

FIG. 10A is a block diagram illustrating a server hosting an emulated software environment for virtualization according to one embodiment of the disclosure. An operating system 1002 executing on a server includes drivers for accessing hardware components, such as a networking layer 1004 for accessing the communications adapter 914. The operating system 1002 may be, for example, Linux. An emulated environment 1008 in the operating system 1002 executes a program 1010, such as CPCommOS. The program 1010 accesses the networking layer 1004 of the operating system 1002 through a non-emulated interface 1006, such as XNIOP. The non-emulated interface 1006 translates requests from the program 1010 executing in the emulated environment 1008 for the networking layer 1004 of the operating system 1002.

Figure 10B:
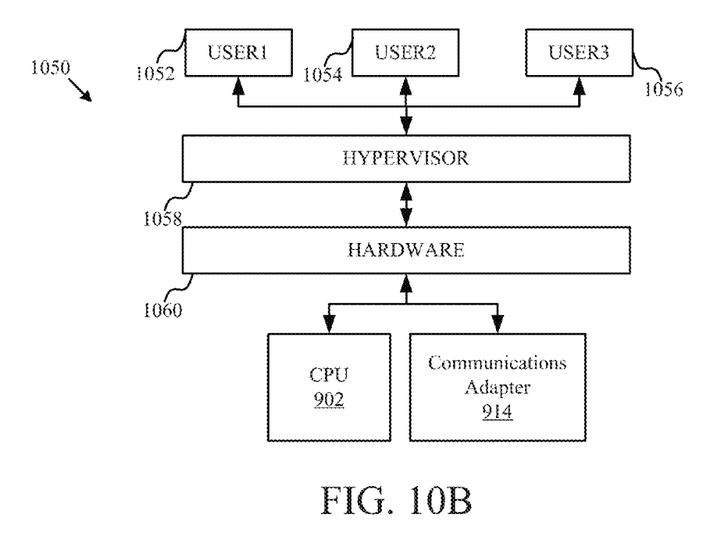
FIG. 10B is a block diagram illustrating a server hosting an emulated hardware environment according to one embodiment of the disclosure.

In another example, hardware in a computer system may be virtualized through a hypervisor. FIG. 10B is a block diagram illustrating a server hosting an emulated hardware environment according to one embodiment of the disclosure. Users 1052, 1054, 1056 may access the hardware 1060 through a hypervisor 1058. The hypervisor 1058 may be integrated with the hardware 1060 to provide virtualization of the hardware 1060 without an operating system, such as in the configuration illustrated in FIG. 10A. The hypervisor 1058 may provide access to the hardware 1060, including the CPU 902 and the communications adaptor 914.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method for providing dynamic licensing for a plurality of virtual machines running on a programmable computing system, comprising:
    receiving, by the computing system, licensing requests for a plurality of virtual machines;
    determining, by the computing system, a quantity of licenses for the plurality of virtual machines to request the licenses from a first license source;
    requesting, by the computing system, the quantity of licenses from the first license source;
    receiving, by the computing system, from the first licensing source, a license for each of the virtual machines authorized to communicate with other members of a community of interest; and
    wherein, when the computing system receives the requested quantity of licenses, the virtual machines communicate with other computing systems using encrypted data in which the encryption key used associates each of the virtual machines with the community of interest authorized to receive the communication.

2. The method of claim 1, in which the license source is at least one of a gateway, a license server, a license relay, and a license proxy.

3. The method of claim 1, further comprising:
    receiving a denial of the quantity of licenses from the first license source; and
    requesting the quantity of licenses from a second source.

4. The method of claim 1, in which the step of requesting the quantity of licenses is repeated periodically.

5. The method of claim 4, further comprising releasing the quantity of licenses after a predetermined period of time.

6. The method of claim 1, further comprising receiving the quantity of licenses from the first license source, in which the quantity of licenses are formatted in an extensible markup language (XML) document.

7. The method of claim 6, further comprising reporting a status of license allocations including at least one of a number of licenses available, a total number of licenses allocated, and a number allocated on a sink-by-sink basis.

8. A computer program product for providing dynamic licensing for a plurality of virtual machines running on a programmable computing system, comprising:
    a non-transitory computer readable medium comprising:
        code to receive, by the computing system, licensing requests for a plurality of virtual machines;
        code to determine, by the computing system, a quantity of licenses for the plurality of virtual machines to request the licenses from a first license source;
        code to request, by the computing system, the quantity of licenses from the first license source;
        code to receive, by the computing system, from the first licensing source, a license for each of the virtual machines authorized to communicate with other members of a community of interest; and
        wherein, when the computing system receives the requested quantity of licenses, the virtual machines communicate with other computing systems using encrypted data in which the encryption key used associates each of the virtual machines with the community of interest authorized to receive the communication.

9. The computer program product of claim 8, in which the medium further comprises:
    code to receive a denial of the quantity of licenses from the first license source; and
    code to request the quantity of licenses from a second source.

10. The computer program product of claim 8, in which the medium further comprises code to repeat periodically the requesting of the quantity of licenses.

11. The computer program product of claim 8, in which the medium further comprises code to release the quantity of licenses after a predetermined period of time.

12. The computer program product of claim 8, in which the medium further comprises code to parse an extensible markup language (XML) file containing the quantity of licenses.

13. The computer program product of claim 8, in which the medium further comprises code to report a status of license allocations including at least one of a number of licenses available, a total number of licenses allocated, and a number allocated on a sink-by-sink basis.

14. An apparatus for providing dynamic licensing for a plurality of virtual machines running on a programmable computing system, comprising:
    a memory;
    a network interface; and
    a processor coupled to the memory and to the network interface, in which the processor is configured:
        to receive, by the computing system, licensing requests for a plurality of virtual machines;
        to determine, by the computing system, a quantity of licenses for the plurality of virtual machines to request the licenses from a first license source;
        to request, by the computing system, the quantity of licenses from the first license source;
        to receive, by the computing system, from the first licensing source, a license for each of the virtual machines authorized to communicate with other members of a community of interest; and
        wherein, when the computing system receives the requested quantity of licenses, the virtual machines communicate with other computing systems using encrypted data in which the encryption key used associates each of the virtual machines with the community of interest authorized to receive the communication.

15. The apparatus of claim 14, in which the license source is at least one of a gateway, a license server, and a license relay.

16. The apparatus of claim 14, in which the processor is further configured:
   to receive a denial of the quantity of licenses from the first license source; and
   to request the quantity of licenses from a second source.

17. The apparatus of claim 14, in which the processor is further configured to repeat periodically the requesting of the quantity of licenses.

18. The apparatus of claim 14, in which the processor is further configured to release the quantity of licenses after a predetermined period of time.

19. The apparatus of claim 14, in which the processor is further configured to parse an extensible markup language (XML) file containing the quantity of licenses.

20. The apparatus of claim 14, in which the processor is further configured to report a status of license allocations including at least one of a number of licenses available, a total number of licenses allocated, and a number allocated on a sink-by-sink basis.

* * * * *